May 6, 1958  J. F. FOSTER  2,833,432
TRACTOR MOUNTABLE IMPLEMENT ATTACHMENT
Filed Jan. 14, 1955
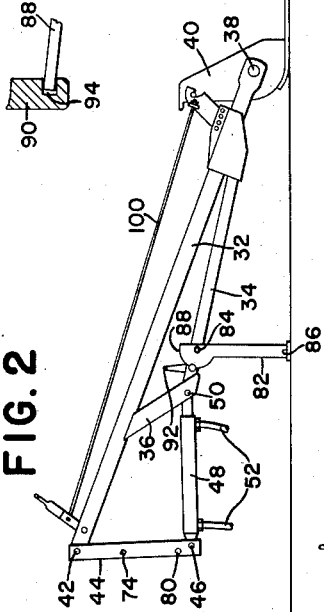
INVENTOR.
J. F. FOSTER

United States Patent Office 2,833,432
Patented May 6, 1958

2,833,432
TRACTOR MOUNTABLE IMPLEMENT ATTACHMENT

Jack F. Foster, Moline, Ill., assignor to Deere & Company, Moline, Ill., a corporation of Illinois Application January 14, 1955, Serial No. 481,903

13 Claims. (Cl. 214—131)

This invention relates to an agricultural implement and more particularly to improved attaching means for mounting such implement, and primarily an implement of the loader type, on a typical agricultural tractor.

One of the characteristics of agricultural tractor design is that it be fairly capable of receiving a wide variety of implement attachments, ranging all the way from mounted cultivators and the like to such equipment as loaders, shovels, etc. Fundamental tractor design provides the tractor with a relatively narrow, fore-and-aft extending body carried on a transverse rear axle and it is known to utilize the transverse portions of the rear axle as a base on which the various implements can be mounted. Throughout the history of the use of the agricultural tractor and allied equipment, the problem of a simple and inexpensive implement mounting has consistently plagued the designer and various attempts have been made to solve the problem. Some of these solutions are fairly satisfactory in certain circumstances and others leave much to be desired. What is sought primarily in a successful solution to the problem is economy, speed of attachment and detachment, and long life of the parts.

According to the present invention, an improved mounting attachment is provided for an implement and specifically for an implement of the manure loader type which, as is conventional, comprises an elongated frame having a rear end proximate to and a front end remote from the tractor rear axle, the nature of the frame being such that it embraces the tractor from the front and thus requires that it be mounted on and dismounted from the tractor either by complete disassembly of the frame or by supporting the frame in such fashion that, after it is detached from the tractor, the tractor can be driven rearwardly out of and forwardly into the frame. Consequently, the mounting attachment requires means for receiving the implement as the tractor is driven forwardly into place. At the same time, the attachment means must include provision for securing the received implement in position. According to the present invention, the mounting attachment comprises an upright support of U-shaped section, facing forwardly to define a pocket into which an upright part on the implement frame is receivable. Moreover, the relationship between the support and the implement part is such that the two are capable of being moved relatively vertically after fore-and-aft receipt. The vertical movement is accompanied by the action of cam means engageable between the two and a locking pin is inserted to create the necessary rigidity.

The invention further features an improved and novel supporting leg capable of holding the implement in a position in which it can be readily received by the tractor. A further function of the leg is to serve as a fulcrum about which the frame may pivot to create the necessary vertical movement entailed in the receiving and ejecting action of the cooperative mounting and implement parts. It is another object of the invention to provide improved means for securing the leg selectively in transport or stand positions.

The foregoing and other important objects and desirable features of the invention will become apparent as a preferred embodiment of the invention is disclosed in detail in the ensuing specification and accompanying sheet of drawings, the several figures of which will be described immediately below.

Fig. 1 is a side elevational view of a typical agricultural tractor, equipped with the supporting parts of the attachment.

Fig. 2 is an elevational view of the implement or loader, shown in its dismounted and ground-supported position.

Fig. 3 is a view of the tractor and loader when assembled.

Fig. 4 is an enlarged fragmentary view illustrating the basic parts of the mounting attachment.

Fig. 5 is a sectional view, as seen on the line 5—5 of Fig. 4.

Fig. 6 is a fragmentary plan view of a portion of the frame and supporting leg.

Fig. 7 is a transverse sectional view on the line 7—7 of Fig. 6.

Fig. 8 is a fragmentary sectional view on an enlarged scale and illustrating a portion of the structure designated by the encircled numeral 8 in Fig. 6.

As already indicated, the tractor shown in Figs. 1 and 3 is typical of an agricultural tractor of the type having a fore-and-aft body 10 carried on front and rear wheels 12 and 14. The rear portion of the body has a transverse axle structure including right- and left-hand axle portions 16 (only the right-hand one of which is shown) for carrying the wheels 14. The tractor illustrated in the drawings is shown as being equipped with a rear-mounted hydraulic power control system 18, a typical example of which is shown in U. S. Patent 2,532,552. However, the details are unimportant here.

The axle portion 16 is typically provided with front and rear mounting faces 20 and 22 from which project mounting studs 24 and 26, respectively. These studs carry threaded thereon clamping nuts 28 and 30, respectively.

The implement, here a typical manure loader, is shown by itself in Fig. 2 and is shown as being mounted on the tractor in Fig. 3. This loader comprises an elongated frame 32 having a truss portion made up of elongated members 34 and 36, the member 34 of which lies substantially horizontal in the normal position of the loader. Conventionally mounted at the front end of the loader on a transverse pivot 38 is a bucket or scoop 40. The rear end of the frame inclines upwardly and rearwardly and has pivoted thereto on a transverse axis at 42 a depending mounting part 44. The lower end of the part 44 is pivotally connected at 46 to a conventional cylinder and piston assembly 48, the piston rod of which is connected at 50 to the frame at the junction of the truss members 34 and 36. When the loader is mounted on the tractor, the cylinder and piston assembly is powered by means of the power control means 18 and fluid lines 52. As will be seen, extension of the cylinder and piston assembly 48 causes the loader to swing about the pivot at 42.

The implement attachment, here represented by the loader, is mountable on and demountable from the tractor by means of cooperation between the mounting part 44 and an attaching support, designated generally by the numeral 54, carried by the tractor axle 16. The mounting assembly includes an elongated upright member 56 of U-shaped section, having its bight 58 at the rear and a pair of laterally spaced apart, forwardly extending walls 60 facing forwardly, each of the walls being outwardly and forwardly flared at 62 to facilitate receipt of the loader-carried part 44. Because of its U-shaped section, the member 56 defines a forwardly and upwardly and downwardly opening pocket.

The bight 58 of the member 56 is spaced ahead of the forward mounting face 20 of the axle 16 and the member is further offset laterally from the front mounting stud 24. Spacer means 64 is interposed between the member and the front face 20 to fill the gap therebetween, and this spacer means includes a lateral projection 66 that is apertured to receive the stud 24. The locking nut 28 on the stud secures the member in place. It will be understood that there are a pair of vertically spaced studs 24 and the mounting member is thus rigidly affixed to the axle.

Here, as in the claims, the use of the expressions "front" and "rear" is for convenience and clarity only, since a conventional loader is normally mounted ahead of the rear axle of the tractor. However, the parts could just as well be reversed without departing from the spirit of the invention. Accordingly, the expressions are used as illustrative and not limiting.

The upper end portion of the member 56 projects above the level of the axle 16. This portion of the member is braced by a diagonal brace 68 that has one end received by and secured to the rear upper mounting stud 26 and its other end hooked over a rod 70 welded to the member 56.

The upper ends of the side walls 60 of the member 56 are downwardly notched to afford downwardly and rearwardly inclined cam surfaces 72. A squared stud 74, passed through the implement part 44, to have its opposite ends projecting laterally, provides cam means cooperative respectively with the cam means 72. Hence, when the part 44 is received by the member 56, the squared studs 74 slide downwardly and rearwardly on the cam surfaces 72 and effect a wedging action that increases the rigidity of the connection between the two members. A fastener in the form of a locking pin 76 is passed through registering apertures in the lower ends of the member 56 and part 44, the near aperture in the member 56 being visible at 78, and the pin-receiving aperture in the part 44 being visible at 80 in Fig. 2.

Another feature of the invention is a dismounting leg 82. This leg is pivoted at one end at 84 to the frame member 34 on a transverse axis and has at its other end a flange 86 adapted, when the leg supports the frame 32, to engage the ground. As best shown in Fig. 7, the leg 82 is of U-shaped section so as to partially embrace the frame member 34 when the leg is in its transport position as illustrated in Fig. 3. The leg has thereon, preferably formed integrally therewith, an extension 88 which has an arcuate edge formed about the axis of the pivot 84. The leg is swingable from the transport position of Fig. 3 to the stand position of Fig. 2, the swinging movement taking place, of course, about the pivot 84. Means is provided for releasably retaining the leg in either of these positions. This means comprises a transverse locking pin 90, one end of which is threaded to receive a tail nut 92, and the other end of which has a portion formed with a groove 94 transverse to the axis of the pin. The arcuate extension 88 is flexible so as to be capable of distortion away from and back to its normal radial plane. When the tail nut 92 is loosened, the arcuate portion 88 runs freely in the groove 94 of the pin 90, whereby the leg may be freely swung between its two positions. However, when the tail nut is tightened, it serves as means for moving the pin 90 axially inwardly to effect a clamping force on the arcuate extension, the extension being distortable, as previously indicated, to increase the frictional engagement between the two.

When the loader is mounted on the tractor, it is braced by means of a brace 96 that has its upper end connected to the loader frame by the pivot 42 and its lower end connected to the tractor at 98. Not material to the present invention but referred to merely because illustrated is bucket control means 100 for effecting latching and release of the bucket 40.

*Use and operation*

When the loader is detached from the tractor, it is supported as shown in Fig. 2. That is to say, its front end rests on the ground by means of the bucket 40 and its intermediate portion is supported at a predetermined level by the leg 82. With the parts at this level, the cam stud 74 is higher than the upper end of the mounting means 54. The tractor is then driven forwardly into the ground-supported loader until the loader-mounting part 44 is received rearwardly in the pocket formed in the means 54. The ground-engaging leg 82 then serves as a fulcrum about which an upward force may be applied to the front end of the loader frame, resulting in the application of a downward force on the mounting part 44. This downward force is followed by engagement between the cam means at 72—74, thus rigidifying the receipt of the part 44 in the means 54, following which the fastener pin 76 is inserted. The hose connections 52 are effected and the tail nut 92 is released so that the leg 82 may be swung to the transport position of Fig. 3, after which the tail nut is tightened to retain the leg in its transport position. The brace 96 is installed and the tractor-mounted loader is ready for operation as a unitary assembly.

Dismounting of the loader is effected by reversing the foregoing procedure. That is to say, the tractor-mounted loader is driven to a convenient storage place and the bucket 40 is lowered until it is spaced slightly above the ground. The pin 76 is withdrawn (which procedure is repeated, of course, at the opposite side of the tractor) and a downward force is applied to the bucket 40, after the leg 82 is lowered, so that the leg serves as a fulcrum about which the loader is bodily rocked in a clockwise direction. This effects withdrawal of the cam stud 74 from the cam means 72. The hoses 52 are disconnected from the power control means 18 and the tractor may be driven rearwardly away from the now ground-supported loader.

Various features of the invention not categorically enumerated will undoubtedly occur to those versed in the art, as will many modifications and alterations in the preferred embodiment of the invention illustrated, all of which may be achieved without departing from the spirit and scope of the invention.

What is claimed is:

1. For use with a tractor having a fore-and-aft body including a transversely projecting rear axle portion: an implement mounting attachment comprising an upright support having means for the rigid affixation thereof to the axle portion, said support being of U-shaped section having its bight at the rear and a pair of laterally spaced apart walls opening forwardly to define a pocket, said walls having upper and lower ends and at least one of said walls having an aperture therein at its lower end and at least one of said walls having a downwardly and rearwardly sloping cam surface at its upper end; an upright implement part receivable rearwardly and downwardly in the pocket between the support walls and having an upper portion provided with cam means engaging the aforesaid cam surface upon the application of downward pressure to said part, and said part having a lower portion including an aperture registerable with the aforesaid wall aperture; and releasable fastener means receivable in the registered apertures to prevent separation of the support and part.

2. The invention defined in claim 1, in which: the walls have forward portions flared outwardly and forwardly to facilitate entry of the implement part.

3. For use with a tractor having a fore-and-aft body including a transversely projecting rear axle portion of the type including a fore-and-aft mounting stud: an implement mounting attachment comprising an upright support positionable ahead of the axle portion and in laterally offset relation to the stud, said support having spacer means interposed between itself and the front of the axle portion, said spacer means having a portion extending laterally to and rigidly receivable by the stud, said support being of U-shaped section having its bight at the rear and a pair of laterally spaced apart walls opening forwardly to define a pocket, said walls having upper and lower ends and at least one of said walls having an aperture therein at its lower end and at least one of said walls having a downwardly and rearwardly sloping cam surface at its upper end; an upright implement part receivable rearwardly and downwardly in the pocket between the support walls and having an upper portion provided with cam means engaging the aforesaid cam surface upon the application of downward pressure to said part, and said part having a lower portion including an aperture registerable with the aforesaid wall aperture; and releasable fastener means receivable in the registered apertures to prevent separation of the support and part.

4. For use with a tractor having a fore-and-aft body including a transversely projecting rear axle portion: an implement mounting attachment comprising an upright support having means for the rigid affixation thereof to the axle portion, said support being of U-shaped section having its bight at the rear and a pair of laterally spaced apart walls opening forwardly to define a pocket, said walls having upper and lower ends and at least one of said walls having a downwardly and rearwardly sloping cam surface at its upper end; an upright implement part receivable rearwardly and downwardly in the pocket between the support walls and having an upper portion provided with cam means engaging the aforesaid cam surface upon the application of downward pressure to said part; and releasable fastener means interengageable between the support and the part to prevent separation of said support and part.

5. For use with a tractor having a fore-and-aft body including a transverse rear axle portion of the type equipped with front and rear mounting faces from which front and rear mounting studs project: an implement attaching support comprising an upright member having a rear face spaced ahead of the axle portion front face and offset to one side of the front stud and said member having a portion spaced vertically from the axle portion; spacer means secured to the member and filling the space between the rear face of the member and the front face of the axle portion, said spacer means including an apertured lateral projection received by the front stud; and a brace secured at one end to the aforesaid vertically spaced portion of the member and extending diagonally rearwardly to have its other end received by the rear stud on the axle portion.

6. In an implement attachment of the character described: a frame including an elongated member normally spaced above the ground, a dismounting leg having first and second ends and constructed of U-shaped section so as to lie in a transport position along and partially embracing the frame member; pivot means connecting the first end of the leg to the frame member on an axis transverse to the length of the leg and member and mounting the leg for swinging downwardly to a stand position in which it is essentially upright so that its second end is engageable with the ground; means on the leg at its first end and forming an extension thereof beyond the axis of the pivot means, said extension having an arcuate edge about said axis; a locking pin axially movably carried by the frame member on an axis parallel to the aforesaid axis and intersecting said arcuate extension, said pin having at one end a groove in which the arcuate edge runs to enable movement of the leg between its transport and stand positions; and means for moving the pin along its axis to effect a clamping force on the arcuate extension for releasably securing the leg in at least one of its positions.

7. In an implement attachment of the character described: a frame including an elongated member normally spaced above the ground, a dismounting leg having first and second ends and constructed of U-shaped section so as to lie in a transport position along and partially embracing the frame member; pivot means connecting the first end of the leg to the frame member on an axis transverse to the length of the leg and member and mounting the leg for swinging downwardly to a stand position in which it is essentially upright so that its second end is engageable with the ground; means on the leg at its first end and forming an extension thereof beyond the axis of the pivot means; and means cooperative between the frame member and the leg extension to effect a clamping force on said extension for releasably securing the leg in at least one of its positions.

8. In an implement attachment of the character described: a frame including an elongated member normally spaced above the ground, a dismounting leg having first and second ends; pivot means connecting the first end of the leg to the frame member on an axis transverse to the length of the leg and member and mounting the leg for swinging downwardly from a transport position to a stand position in which it is essentially upright so that its second end is engageable with the ground; means on the leg at its first end and forming an extension thereof beyond the axis of the pivot means, said extension having an arcuate edge about said axis; a locking pin axially movably carried by the frame member on an axis parallel to the aforesaid axis and intersecting said arcuate extension, said pin having at one end a groove in which the arcuate edge runs to enable movement of the leg between its transport and stand positions; and means for moving the pin along its axis to effect a clamping force on the arcuate extension for releasably securing the leg in at least one of its positions.

9. The invention defined in claim 8, in which: the arcuate extension has flexibility away from and back to its normal radial plane in which it runs relatively freely in the pin groove; and said flexibility affords distortion of said extension upon movement of the pin to exert said clamping force.

10. In an implement attachment of the character described: a frame including an elongated member normally spaced above the ground, a dismounting leg having first and second ends; pivot means connecting the first end of the leg to the frame member on an axis transverse to the length of the leg and member and mounting the leg for swinging downwardly from a transport position to a stand position in which it is essentially upright so that its second end is engageable with the ground; means on the leg at its first end and forming an extension thereof beyond the axis of the pivot means, said extension having an arcuate edge about said axis; a locking pin axially movably carried by the frame member on an axis parallel to the aforesaid axis and intersecting said arcuate extension, said pin having at one end a portion frictionally engageable with and releasable from said arcuate edge, said pin being axially movable in one direction to increase and in the opposite direction to decrease the frictional engagement thereof with said edge; and means for moving the pin selectively in said opposite directions.

11. For use with a tractor having a fore-and-aft body including a transversely projecting rear axle portion: an implement mounting attachment comprising a pair of upright rigid supporting elements mounted on the axle and implement respectively, the element on the axle being rigidly affixed thereto, one of said elements having a fore-and-aft disposed cam surface inclined to the horizontal and terminating intermediate the front and rear edges on the one element, and an aperture spaced from the cam surface, the other of said elements having cam means engaging the aforesaid cam surface upon the application of downward pressure of the implement on the tractor and an aperture registrable with the aperture of said one element upon the cam means being seated adjacent the lower portion of the cam surface; and releasable fastener means receivable in the registered apertures to prevent separation of the pair of elements; and means limiting relative transverse movement between the pair of elements.

12. For use with a tractor having a fore-and-aft body including a transversely projecting rear axle portion: an implement mounting attachment comprising a pair of supporting elements mounted on the axle portion and implement respectively and including an upright supporting element having a U-shaped cross section including a transverse wall portion and a pair of fore-and-aft extending wall portions and a cooperating upright supporting element adapted to fit between the fore-and-aft extending wall portions, one of said pair of elements having a fore-and-aft disposed cam surface inclined to the horizontal and terminating intermediate the front and rear edges of the one element, said one element having an aperture spaced from the cam surface, the other of said pair of elements having cam means engaging the aforesaid cam surface upon the application of downward pressure of the implement on the tractor and an aperture registrable with the aperture of said one element upon the cam means being seated adjacent the lower portion of the cam surface; and releasable fastener means receivable in the registered apertures to prevent fore-and-aft separation of the elements.

13. For use with a tractor having a fore-and-aft body including a transversely projecting rear axle portion: an implement mounting attachment comprising a pair of supporting elements mounted on the axle portion and implement respectively and including an upright supporting element having a U-shaped cross section including a transverse wall portion and a pair of fore-and-aft extending wall portions and a cooperating upright supporting element adapted to fit between the fore-and-aft extending wall portions, one of said pair of elements having a fore-and-aft disposed cam surface inclined to the horizontal and terminating intermediate the front and rear edges of the one element, the other of said pair of elements having cam means engaging the aforesaid cam surface upon the application of downward pressure of the implement on the tractor; and releasable fastener means spaced from the cam surface and cam means connecting the elements to prevent fore-and-aft separation thereof.

References Cited in the file of this patent

UNITED STATES PATENTS

| | | |
|---|---|---|
| 2,092,608 | Lindgren et al. | Sept. 7, 1937 |
| 2,178,249 | Court | Oct. 31, 1939 |
| 2,437,808 | Drettmann | Mar. 16, 1948 |